United States Patent
Kuga et al.

(10) Patent No.: US 6,808,465 B2
(45) Date of Patent: Oct. 26, 2004

(54) V-BELT TYPE TRANSMISSION

(75) Inventors: Shinji Kuga, Saitama (JP); Takashi Ohyama, Saitama (JP); Ryuji Tsuchiya, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/826,862

(22) Filed: Apr. 6, 2001

(65) Prior Publication Data

US 2001/0034280 A1 Oct. 25, 2001

(30) Foreign Application Priority Data

Apr. 6, 2000 (JP) ...................................... 2000-105371

(51) Int. Cl.[7] .............................................. F16H 59/00
(52) U.S. Cl. ......................... 474/14; 474/93; 474/144; 180/227
(58) Field of Search ........................... 474/8, 9, 10, 11, 474/12, 13, 14, 93, 144, 145, 146; 180/68.1, 68.2, 229, 230, 231, 219, 227

(56) References Cited

U.S. PATENT DOCUMENTS

| | | | |
|---|---|---|---|
| 4,178,808 A | * 12/1979 | Bacher | 74/230 |
| 4,345,664 A | * 8/1982 | Anno et al. | 180/230 |
| 4,515,575 A | * 5/1985 | Kinbara et al. | 474/13 |
| 4,567,958 A | * 2/1986 | Ishihara | 180/230 |
| 4,671,782 A | * 6/1987 | Ochiai et al. | 474/93 |
| 4,712,629 A | * 12/1987 | Takahashi et al. | 180/68.1 |
| 4,793,301 A | * 12/1988 | Ishikawa | 123/196 R |
| 4,846,115 A | * 7/1989 | Ishikawa | 123/41.7 |
| 4,846,124 A | * 7/1989 | Suzuki et al. | 123/195 P |
| 4,887,488 A | * 12/1989 | Miyazaki | 180/227 |
| 5,584,410 A | * 12/1996 | Siblik | 220/320 |
| 6,135,083 A | * 10/2000 | Masuda et al. | 123/257 |
| 6,155,371 A | * 12/2000 | Izumi | 180/292 |

FOREIGN PATENT DOCUMENTS

| | | | |
|---|---|---|---|
| DE | 24 23 746 A | 11/1975 | |
| DE | 27 41 146 A | 3/1978 | |
| DE | 40 16 613 A1 | 11/1991 | |
| EP | 0 243 896 A2 | 4/1987 | |
| JP | 2-180344 | * 6/1990 | F16H/9/18 |
| JP | 02 240437 A | 9/1990 | |
| JP | A9264391 | 10/1997 | |
| JP | 10-291420 A | 11/1998 | |
| JP | 11 173392 A | 6/1999 | |

* cited by examiner

*Primary Examiner*—David A. Bucci
*Assistant Examiner*—Timothy McAnulty
(74) *Attorney, Agent, or Firm*—Birch, Stewart, Kolasch & Birch, LLP (57) ABSTRACT

In a V-belt type transmission having a V-belt entrained on a pulley, the pulley includes a fixed pulley half fixed to an end portion of a crankshaft and a movable pulley half supported on the crankshaft but axially slidable in opposition to the fixed pulley half. The fixed pulley half is secured with a bolt that is threaded and engaged with a female screw formed inside an end portion of the crankshaft. The V-belt type transmission is capable of securely clamping a fixed pulley half and is capable of preventing the entry of dust and water into a fixed pulley half threaded portion formed in an end portion of the crankshaft. This arrangement protects against the formation of rust and corrosion.

17 Claims, 6 Drawing Sheets

V-BELT TYPE TRANSMISSION

BACKGROUND OF THE INVENTION

1. Field of the Invention

The present invention relates to a V-belt type transmission, and more particularly to a V-belt type transmission for a vehicle wherein power is transmitted using a V-belt mounted spanning between pulleys.

2. Description of the Background Art

In a V-belt type transmission of the background art, wherein a V-belt is mounted spanning between a pair of pulleys. The pair of pulleys includes a fixed pulley half and a movable pulley half. Power is transmitted in a continuously various speed change mode. The fixed pulley half is fixed to an end portion of a crankshaft and the movable pulley half is disposed inside the fixed pulley half. According to arrangements in the background art, the fixed pulley half is clamped and fixed with a nut that is threadingly engaged with a male screw formed on an end portion of the crankshaft.

Figure 6:
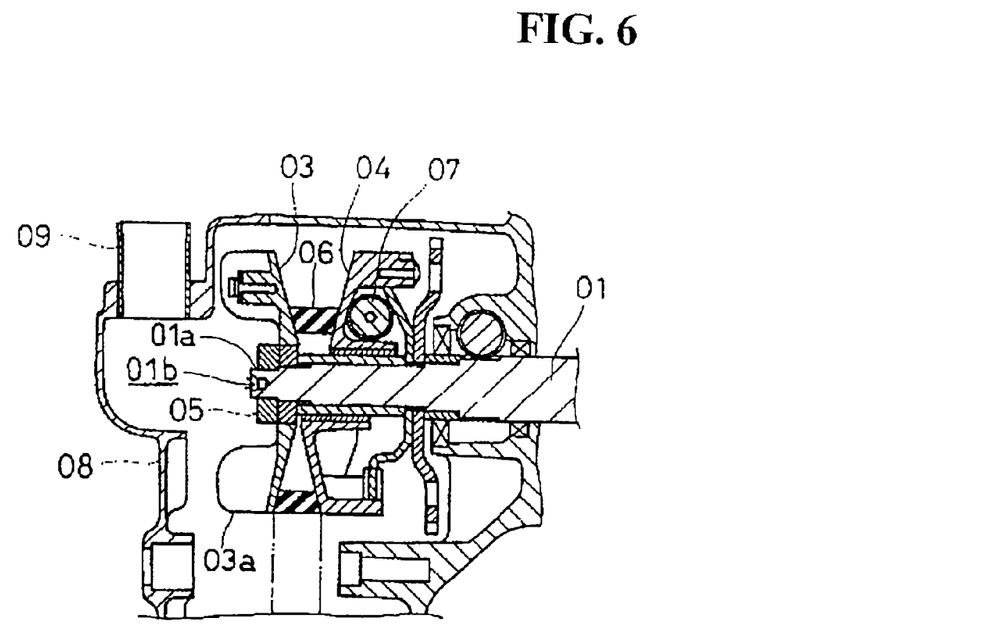
FIG. 6 is a sectional view of a driving pulley according to the background art.

FIG. 6 shows an example of the foregoing type of arrangement as described in JP-A No. Hei 9-264391 of the background art. A V-belt type transmission used in a scooter type motor vehicle is described. FIG. 6 shows a pulley 02 mounted on a crankshaft 01 side of the V-belt type transmission.

A male screw 01*a* and a serrated portion are formed so as to project on an end portion of the crankshaft 01. A fixed pulley half 03, which is serration-fitted on the end portion of the crankshaft, is clamped and fixed with a nut 05 which is threadingly engaged with the male screw 01*a*. An axially slidable, movable pulley half 04 is supported inside the fixed pulley half 03.

A V-belt 06 is arranged between the fixed pulley half 03 and the movable pulley half 04, and a centrifugal weight 07 is provided on the back of the movable pulley half 04. The centrifugal weight 07, which operates in accordance with the speed of rotation of the crankshaft 01, moves the movable pulley half 04 axially to change the winding diameter of the V-belt. Accordingly, power is transferred in a continuously various speed change mode to the rear wheel side.

Cooling fins 03*a* are formed on the back of the fixed pulley half 03. By rotation of the cooling fins 03*a*, air is introduced through an air inlet pipe 09 provided in a belt cover 08 to cool a power transfer mechanism and thereby improve durability.

When outside air is introduced into the inside of the power transfer cover 08, a filter or the like is sometimes provided in the outside air introducing portion to remove dust or other foreign matters. However, fine dust or the like and water get into the inside of the belt cover 08 and reach the threadingly engaged portion of the male screw 01*a* and the nut 05 at the end portion of the crankshaft 01. This may result in rusting and the threadingly engaged portion and the nut 05 becoming seized in place.

Moreover, a posture varying force of the fixed pulley half 03 against the crankshaft 01, which is induced by a belt reaction force, acts detrimentally upon the nut 05. This force acting on the nut 05 which is clamped on the outside of the fixed pulley half 03 in threaded engagement with the end portion of the crankshaft has been problematic in systems of the background art. Consequently, in order to ensure a sufficient strength, the threadingly engaged portion of the male screw 01*a* and the nut 05 is often made larger in size, which may result in an obstruction to the introduction of the outside air.

In the case where the crankshaft 01 is formed integrally with crank pins by molding, center holes for supporting the crankshaft 01 at both shaft ends must be formed respectively with male screws 01*a* at the shaft ends at the time of machining the crankshaft. As shown in FIG. 6, the center hole 01*b* formed in each male screw 01*a* is restricted to a size smaller than the size of the male screw 01*a*. Thus, a sufficient support area is not obtained and it is difficult to attain a high machining accuracy. Accordingly, machinability is poor and expensive.

SUMMARY OF THE INVENTION

The present invention overcomes the shortcomings associated with the background art and achieves other advantages not realized by the background art.

It is an object of the present invention to provide a V-belt type transmission capable of clamping a fixed pulley half securely to a crankshaft.

It is a further object of the present invention to prevent the entry of dust and water into a pulley that has been engaged with a threaded connection to an end portion of a crankshaft, to prevent rusting, etc. of the threaded connection.

These and other aspects of the present invention are accomplished by a V-belt transmission comprising a crankshaft having a drive end; a V-belt arranged between a fixed pulley half fixed to an end portion of the crankshaft and an axially movable pulley half supported on the crankshaft in a position laterally opposite to the fixed pulley half; and a bolt securing the fixed pulley half to the end portion of the crankshaft, the bolt threadingly engaged with a female screw portion formed within an interior portion of the end portion of the crankshaft.

These and other aspects of the present invention are further accomplished by a V-belt transmission comprising a crankshaft having a drive end; a driving pulley operatively connected to the crankshaft; and a driven pulley operatively connected to a rear wheel drive section of the transmission; a V-belt arranged between the driving pulley and the driven pulley, wherein the driving pulley includes a fixed pulley half fixed to an end portion of the crankshaft and an axially movable pulley half supported on the crankshaft in a position laterally opposite to the fixed pulley half; and a bolt securing the fixed pulley half to the end portion of the crankshaft, the bolt threadingly engaged with a bolt hole formed within an interior portion of the end portion of the crankshaft.

Since the fixed pulley half is clamped with a bolt which is threadedly engaged with a female screw formed in the interior of an end portion of the crankshaft, the threadedly engaged portion of the bolt lies within the interior of the end of the crankshaft. Accordingly, the entry of dust and water can be prevented and the transmission can be protected against rust, corrosion, etc.

Further, this arrangement prevents the formation of rust and limits the possibility of seizing of the bolt with the bolt hole. The threaded portion of the bolt can also be made longer and stronger without interfering with the lateral dimensions of the crankshaft or transmission case.

When outside air is introduced from the outside air inlet port and a power transfer mechanism is cooled with the cooling fins, even if the bolt fitted in the end portion of the crankshaft is exposed to dust or water, it is possible to protect the threadedly engaged portion that is secured within the interior of the crankshaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
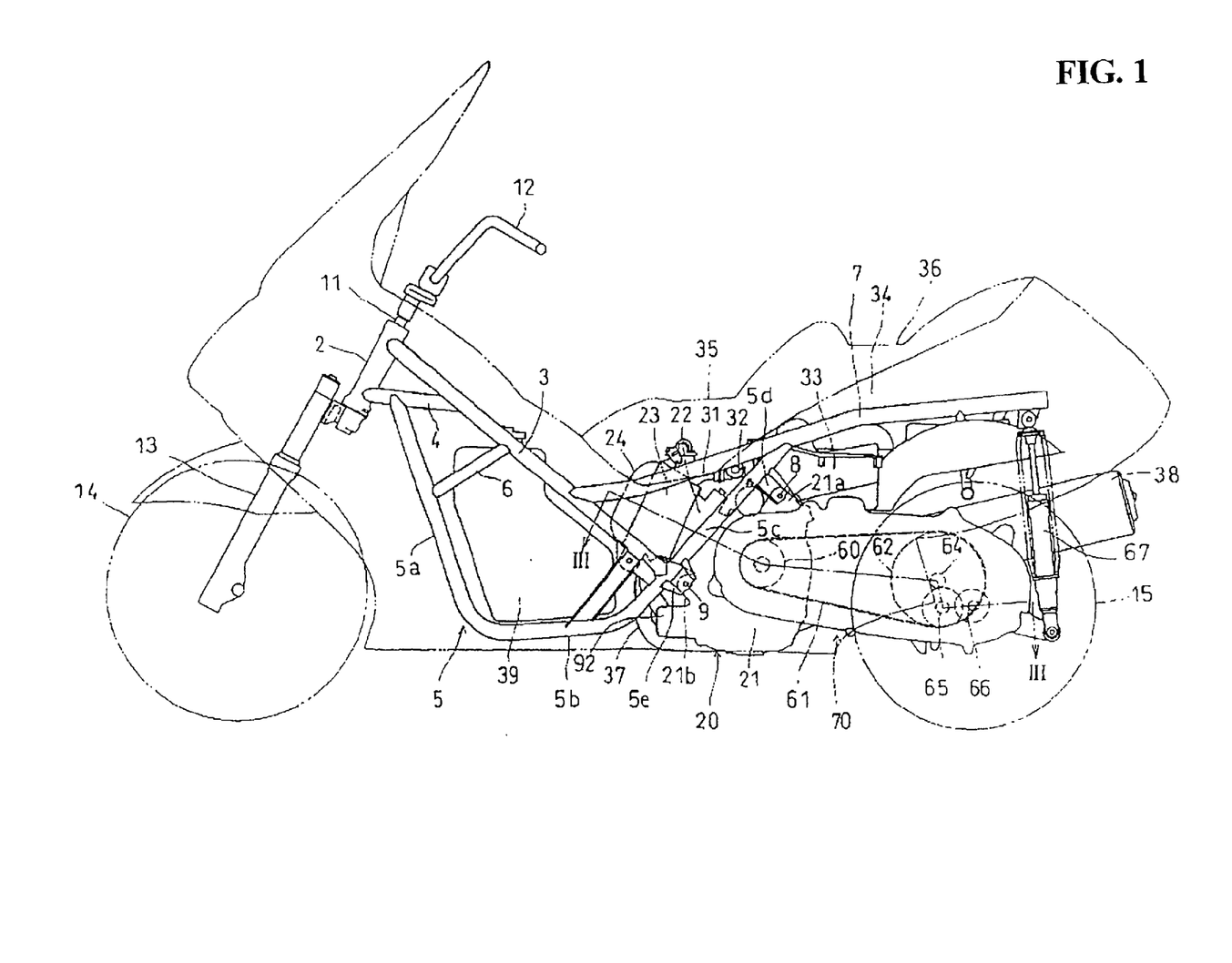
FIG. 1 is a side view of a scooter type motorcycle incorporating an internal combustion engine according to an embodiment of the present invention.
Figure 2:
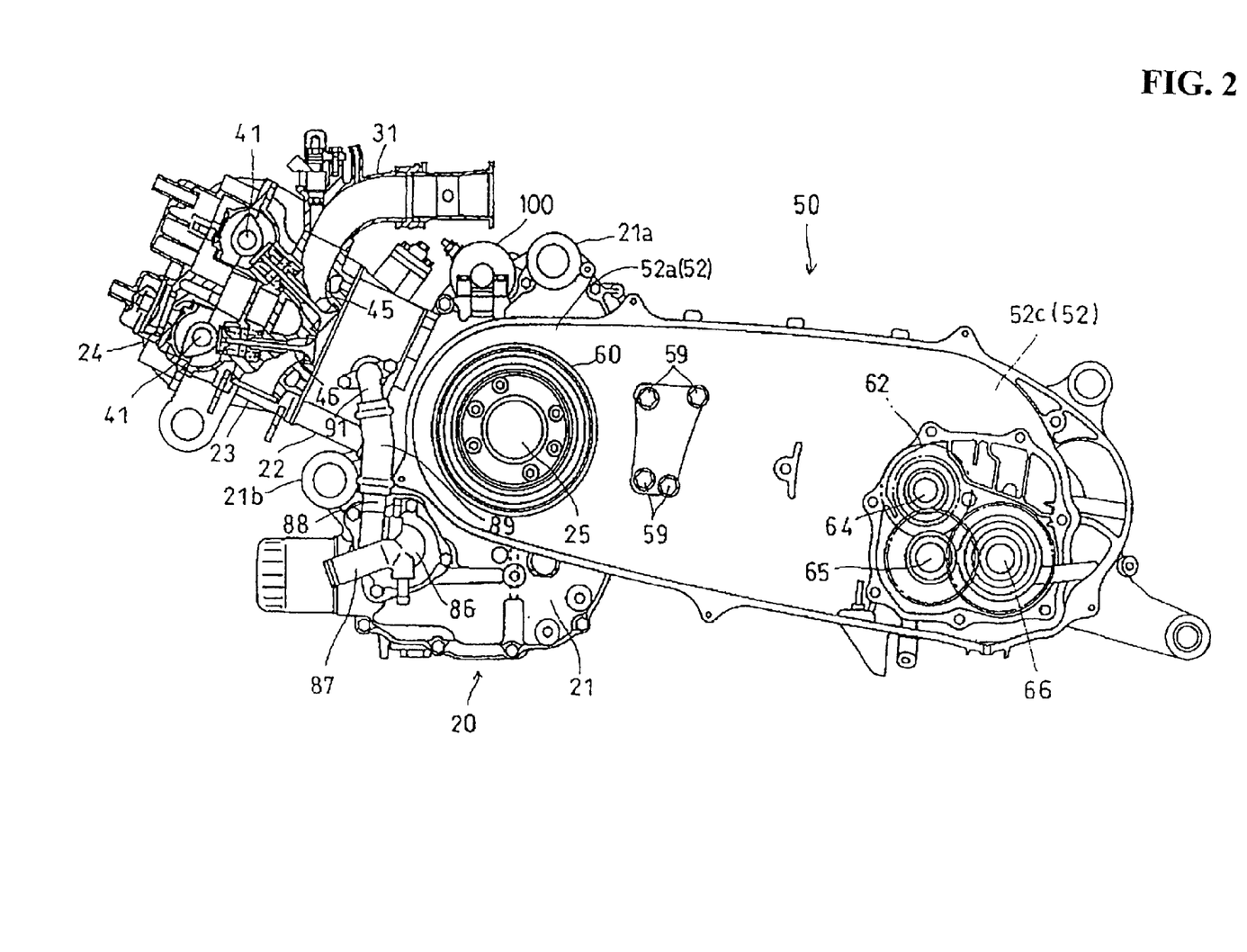
FIG. 2 is a partial, sectional side view of an internal combustion engine and a belt type automatic transmission according to an embodiment of the present invention.
Figure 3:
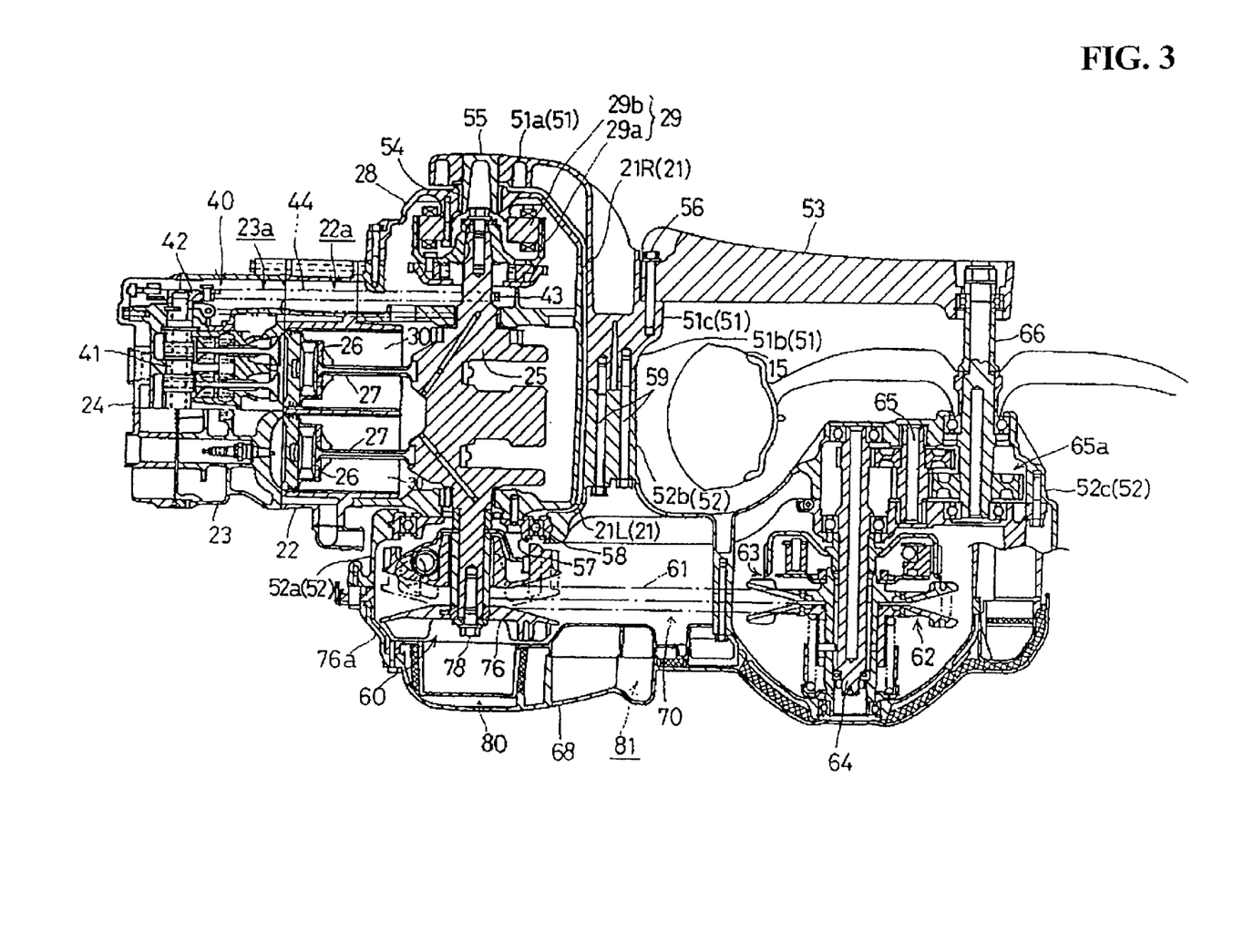
FIG. 3 is a sectional view taken along line III—III in FIG. 1.
Figure 4:
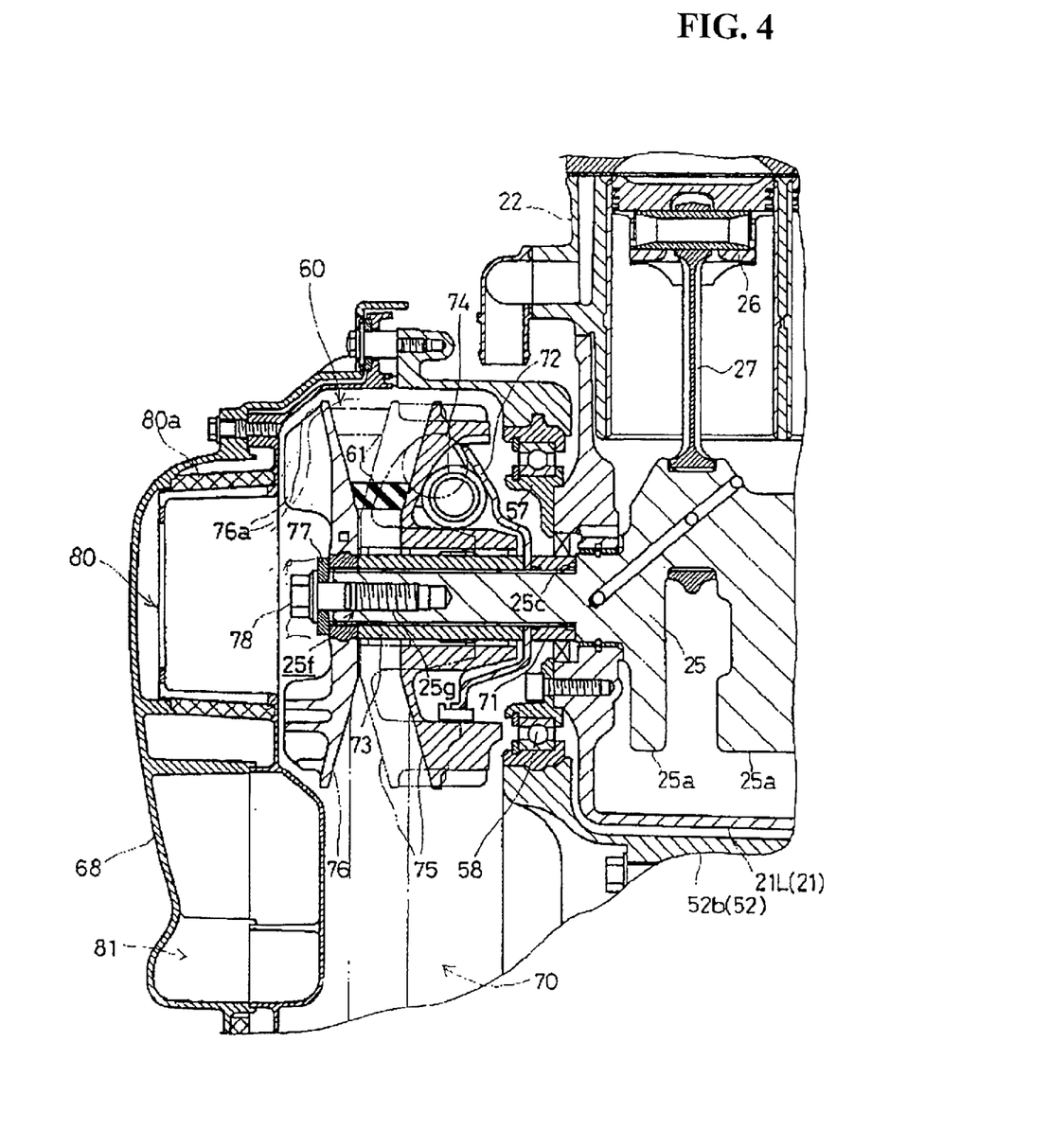
FIG. 4 is a sectional view of a crankshaft according to an embodiment of the present invention.
Figure 5:
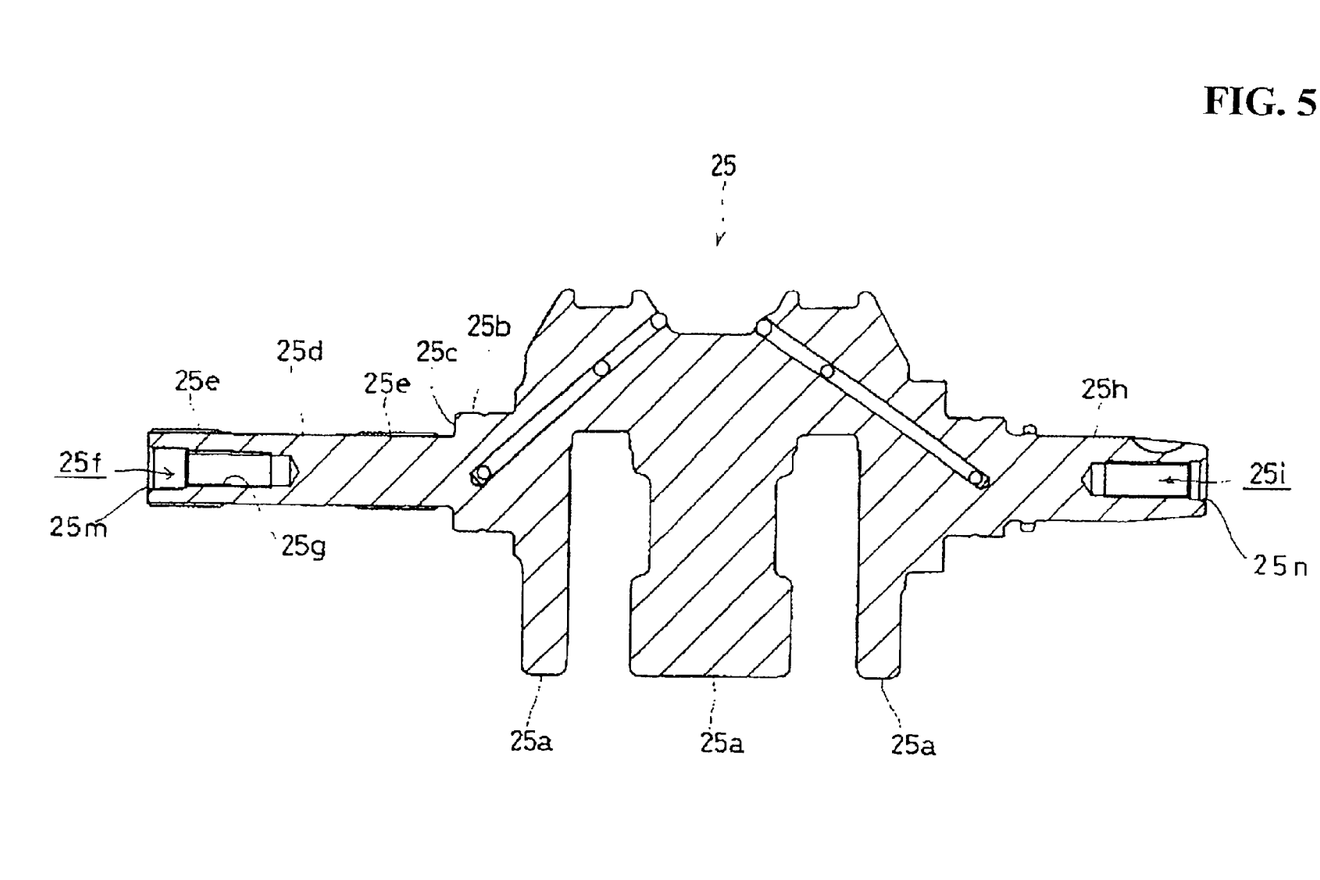
FIG. 5 is a sectional view of a driving pulley according to an embodiment of the present invention.

Hereinafter, the present invention will be described with reference to the accompanying drawings. FIG. 1 is a side view of a scooter type motorcycle incorporating an internal combustion engine according to an embodiment of the present invention. FIG. 2 is a partial, sectional side view of an internal combustion engine and a belt type automatic transmission according to an embodiment of the present invention. FIG. 3 is a sectional view taken along line III—III in FIG. 1. FIG. 4 is a sectional view of a crankshaft according to an embodiment of the present invention. FIG. 5 is a sectional view of a driving pulley according to an embodiment of the present invention. The following description will refer to the right, left, upward, downward, forward and rearward directions with respect to many of a motorcycle's component parts. It will be appreciated that these directions are to be considered with respect to the forward traveling direction of a motorcycle 1 or other motor vehicle as a base reference direction.

A body frame of a scooter type motorcycle 1 includes a pair of right and left main pipes 3 extending backward and obliquely downward in a rectilinear fashion from an upper portion of a head pipe 2 when viewed in a side view. A pair of right and left support pipes 4 extend backward substantially horizontally from a lower portion of the head pipe 2 and are connected to the main pipes 3 to support front portions of the main pipes 3.

A pair of right and left down-pipes 5 extend downward at an acute inclination angle on the right and left sides of the support pipes 4 from intermediate positions of the support pipes to form a pair of front vertical portions 5a. The pair of right and left down-pipes then are bent backward at lower ends of the front vertical portions 5a to form central horizontal portions 5b and are further bent upward at rear ends of the central horizontal portions 5b to form rear inclined portions 5c.

Rear ends of the main pipes 3 are connected to lower portions of the rear inclined portions 5c, and a reinforcing pipe 6 is interposed between each main pipe 3 and each down-pipe 5 which conjointly define a generally triangular shape when viewed in a side view.

Seat rails 7, whose front ends are fixed to the main pipes 3 at positions somewhat close to rear portions of the main pipes with respect to middle portions of the main pipes, extend obliquely upward and backward up to a rear portion of the vehicle body. The rear inclined portions 5c of the down-pipes 5 are connected at their upper ends to middle portions of the seat rails 7 and support the seat rails from below.

The head pipe 2 supports a steering shaft 11. A pair of handle bars 12 extend above the head pipe 2 to the right and left. A front fork 13 extends downward below the head pipe 2. A front wheel 14 is supported at a lower end of the front fork 13 through an axle.

Support brackets 5d and 5e project backward respectively at upper and lower positions of each rear inclined portion 5c of each lower-pipe 5, and an internal combustion engine 20 is suspended from the pair of left and right brackets 5d and 5e on the right and left sides.

The internal combustion engine 20 is a four-cycle, two-cylinder engine, in which a crankcase 21 is positioned behind the rear inclined portions 5c of the down-pipes 5. A cylinder block 22, a cylinder head 23 and a cylinder head cover 24, which are successively stacked on and combined with the crankcase 21, project forward from the rear inclined portions 5c of the lower-pipes 5 in a substantially tilted posture toward a front side of the vehicle.

When viewed from the side, the cylinder block 22, cylinder head 23 and cylinder head cover 24 are positioned between right and left triangular shapes which are generally defined by the rear inclined portions 5c of the right and left down-pipes 5, rear portions of the main pipes 3 and front portions of the seat rails 7. Mounting brackets 21a projecting from an upper portion of the crankcase 21 and mounting brackets 21b projecting from a front portion of the crankcase are supported by the support brackets 5d and 5e, respectively, through support shafts 8 and 9. The internal combustion engine 20 is suspended from the vehicle body frame by these mounting elements.

A front portion of a belt type automatic transmission 50 is pivotally secured to the crankcase 21 of the internal combustion engine 20. The automatic transmission 50 extends backward and a rear portion thereof supports a rear wheel 15 through an axle.

Intake pipes 31 extend upward respectively from the cylinders in the forwardly tilted cylinder head 23 of the internal combustion engine 20, then are curved backward and connect with carburetors 32 which are arranged in parallel on the right and left sides of the crankcase 21. The carburetors 32 are connected to an air cleaner 33 disposed behind the carburetors with respect to the longitudinal direction of the vehicle.

The air cleaner 33 is disposed between the right and left seat rails 7. A helmet receptacle box 34 is supported spanning the seat rails above the air cleaner 33.

A driver seat 35 covers the internal combustion engine 20 and the carburetors 32 from above. The driver seat 35 can be opened and closed to permit access to the components arranged beneath it. Similarly, a pillion 36 covers the helmet receptacle box 34 and a rear portion contiguous thereto from above so that it can be opened and closed as well to allow access to the interior of the vehicle frame.

A pair of exhaust pipes 37 extends downward from the cylinder head 23, then bends rightward in a position in front of the crankcase 21. The exhaust pipes 37 further extend backward along the right-hand side of the crankcase until they reach a position where they are combined together into a single pipe. The single pipe rises obliquely upward along the right-hand side of the vehicle body and is connected to a muffler 38 supported on the right-hand side of the rear wheel 15.

A fuel tank 39 is supported in front of the internal combustion engine 20 in a position spanning four surrounding pipes. These four pipes are the two right and left upper main pipes 3 and two right and left lower-pipes 5 located on front and lower sides.

The scooter type motorcycle 1 for which the present invention may readily be incorporated is generally defined hereinabove.

The following description directed toward the structure of the internal combustion engine 20 and that of the belt type automatic transmission 50 that is pivotally secured to the crankcase 21 is provided hereinafter.

The crankcase 21 includes a combination of left and right crankcases 21L, 21R. As shown in FIG. 3, a crankshaft 25 extends horizontally right and left within the crankcase 21. An outer rotor 29a of an AC generator 29 is fitted on a right end portion of the crankshaft 25 and is covered sideways with a case cover 28 that is fixed to the right crankcase 21R. The case cover 28 supports an inner stator 29b of the AC generator 29.

Pistons 26 adapted to slide and reciprocate through two cylinder 30, respectively, in the cylinder block 22 are connected through with crank pins integral with the crankshaft 25. Both crank pins have a phase angle of 360°.

The cylinder head 23 is provided with a valve operating mechanism 40. In the valve operating mechanism 40, two upper and lower camshafts 41 extend horizontally right and left, cam chain sprockets 42 are fitted respectively on right end portions of the camshafts 41, and a driving chain sprocket 43 is fitted on a base portion of the crankshaft 25 projecting from the right crankcase 21R. A timing chain 44 is mounted in a position spanning between the cam chain sprockets 42 and the drive chain sprocket 43 to facilitate power transfer.

The timing chain 44 extends through cam chain chambers 22a and 23a formed on the right-hand side of both the cylinder block 22 and the cylinder head 23.

The paired camshafts 41 each drive intake valves 45 and exhaust valves 46 at a predetermined timing.

The belt type automatic transmission 50 is pivotally secured to the crankcase 21 of the internal combustion engine 20 generally described hereinabove.

The case cover 28 closes a right opening of the right crankcase 21R and covers the AC generator 29. The case cover 28 has an opening that is coaxial with the crankshaft 25. A rotary shaft 55 projects rightward through the opening and through a bearing 54.

Further, a base end portion 51a of a right transmission case 51 in the belt type automatic transmission 50 is fitted on the above projected portion of the rotary shaft 55. The right transmission case 51 has a connecting portion 51b that extends from the base end portion 51a inwards along the rear of the right crankcase 21R.

Mounting boss portions 51c project backward from two upper and lower positions at the rear of the connecting portion 51b. A left mating surface of a front end of a right fork member 53 is mated with a right mating surface of each mounting boss portion 51c. The right and left mating surfaces are then both secured together via threads from a bolt 56 at the two upper and lower positions. Accordingly, the right fork member 53 is integrally connected to the right transmission case 51 and extends backward.

On the other hand, a left end portion of the crankshaft 25 projects leftward through the left crankcase 21L. A driving pulley 60 provided with a centrifugal speed change mechanism is provided on the projected portion of the crankshaft 25.

An annular support member 57 is fixed to an outer surface of the left crankcase 21L with the crankshaft 25 passing therethrough and around the crankshaft. A base end portion 52a of a left transmission case 52 is pivotally supported by the annular support member 57 through a bearing 58.

The left transmission case 52 has a connecting portion 52b extending inward from the base end portion 52a and along the back of the left crankcase 21 L. The left transmission case 52 also has a left fork portion 52c extending further backward.

The connecting portion 51b of the right transmission case 51 extending inward from the right-hand side and the connecting portion 52b of the left transmission case 52 extending inward from the left-hand side, both along the back of the crankcase 21, abut against each other at their respective mating surfaces. As best seen in FIG. 3, four bolts 59 are inserted and/or threaded into the respective mating portions to connect the right and left transmission cases 51, 52 with each other. The left fork portion 52c and the right fork member 53 are connected in positions opposing each other.

The connected right transmission case 51 is supported swingably around the crankshaft 25 by the bearing 54, while the left transmission case 52 is supported swingably around the crankshaft by the bearing 58. Accordingly, the left fork portion 52c and the right fork member 53 opposing each other are supported integrally and vertically swingably around the crankshaft 25.

A rear portion of the left form portion 52c of the left transmission case 52 serves as a transmission chamber in which a driven shaft 64 is rotatably supported. A driven pulley 62 is supported on the driven shaft 64 through a centrifugal clutch 63.

A V-belt 61 is mounted in a position spanning between the driven pulley 62 and the driving pulley 60 as part of a V-belt type transmission 70.

A reduction mechanism is formed by transmission gears 65a through which a driving force is transmitted from a driven shaft 64 to an axle 66 via a counter shaft 65 and within the transmission chamber formed in the rear portion of the left fork portion 52c.

The axle 66 is rotatably mounted in a position spanning between the left fork portion 52c and the right fork member 53. The rear wheel 15 is rotatably supported by the axle 66 between the left fork portion 52c and the right fork member 53.

Thus, the right and left transmission cases 51, 52 which support the V-belt type transmission 70 are supported so that the left form portion 52c, the right fork member 53 and the rear wheel 15 are swingable (e.g., can pivot relative to the crankshaft in an upward and downward direction relative to the vehicle frame) vertically around the crankshaft 25.

A rear shock absorber 67 is mounted between a rear end of the left transmission case 52 and a seat rail 7.

A left opening of the left transmission case 52 that accommodates the V-belt type transmission 70 is closed with a belt cover 68.

A detailed structure as viewed from the driving pulley 60 side of the V-belt type transmission 70 is shown in FIG. 4.

The driving pulley 60 is mounted on the left end portion of the crankshaft 25. However, the crankshaft 25 is an integral type crankshaft obtained by molding a crank shape and thereafter finishing a journal portion having integral, molded crank pins, as shown in FIG. 5.

A left shaft portion 25d having a reduced diameter projects leftward through a stepped portion 25c from a base end portion 25b of a left crank weight 25a in the crankshaft 25. Serrations 25e having plural ridges facing in the axial direction are formed on an outer peripheral surface of the left shaft portion 25d.

A bolt hole 25f is formed in an end face of the left shaft portion 25d up to a depth of about half of the left shaft portion. A female screw 25g is formed centrally of the bolt hole 25f, however threads are not provided in the right and left end portions sandwiching the central portion of the same hole. A bolt hole 25i is formed in a right shaft portion 25h of the crankshaft 25.

At both left and right ends of the crankshaft 25, open edges of the shaft ends facing the bolt holes 25f and 25i are chamfered in a tapered shape to form tapered portions 25m and 25n.

When the long, integral type crankshaft 25 is to be machined, the tapered portions 25m and 25n are used as center holes for supporting the crankshaft 25 at both ends of the shaft. Accordingly, a sufficient support area larger than the screw size can be ensured, that is, the machining accuracy can be enhanced, and it is possible to improve both machinability and productivity.

A short sleeve 71, a ramp plate 72, and a long sleeve 73 are serration-fitted in this order (as viewed from right to left in FIG. 4) on the left shaft portion 25d of the crankshaft 25. The short sleeve 71 is abutted against the stepped portion 25c and the ramp plate 72 is sandwiched in between the short sleeve 71 and the long sleeve 73.

The long sleeve 73 is also serrated on its outer peripheral surface and a movable pulley half 75 is fitted on the long sleeve so as to be slidable in an axial direction.

A centrifugal weight 74 is inserted between the movable pulley half 75 and the ramp plate 72 in a radially movable manner.

A fixed pulley half 76 is serration-fitted on an end of the left shaft portion 25d exposed from the long sleeve 73.

A peripheral edge portion of a central circular hole of the fixed pulley half 76 projects slightly outwards from the end face of the left shaft portion 25d. A washer 77 is brought into abutment against the peripheral edge portion and a flanged bolt 78 is inserted through the washer 77 so as to threadingly engage the bolt hole 25f.

The bolt 78, when threadingly engaged with the female screw 25g of the bolt hole 25f, secures the fixed pulley half 76, long sleeve 73, ramp plate 72 and short sleeve 71 to the stepped portion 25c of the left shaft portion 25d via the washer 77. The fixed pulley half 76 is thereby secured to the crankshaft 25. Accordingly, the fixed pulley half 76 is clamped and fixed with bolt 78 to the end portion of the crankshaft 25 and rotates together with the crankshaft.

The movable pulley half 75, which is serration-fitted on the long sleeve 73, is axially slidable simultaneously with its rotation together with the crankshaft 25.

The V-belt 61 is entrained on and between the movable pulley half and the fixed pulley half 76 opposed thereto.

Opposed surfaces of the fixed pulley half 76 and the movable pulley half 75 are tapered in a V section. The V-belt 61 is sandwiched in between both tapered surfaces of the V section (as best seen in FIG. 4).

In the driving pulley 60 having the above structure, the centrifugal weight 74 is accommodated radially movable between the movable pulley half 75 and the ramp plate 72 fixed onto the crankshaft 25. Therefore, with an increase in rotational speed of the crankshaft 25, the centrifugal weight 74 moves in the centrifugal direction and causes the movable pulley half 75 to slide leftward. This results in the winding diameter of the V-belt 61 entrained on and between the movable and fixed pulley halves 75, 76 becoming larger. The larger diameter of the V-belt 61 permits automatic speed change in a continuously variable manner and effective power transfer to the rear wheel side of the vehicle and/or the transmission.

Since the fixed pulley half 76 is clamped with bolt 78 to an end portion of the crankshaft 25, the threaded portion (the female screw 25g) does not obstruct the introduction of the outside air although it is long in comparison with a nut. Therefore, the cooling performance for the V-belt type transmission 70 is improved while secure engagement of the driving pulley with the crankshaft 25 is obtained.

Further, since the female screw 25g portion formed inside a an end portion of the crankshaft 25 is formed inwards in the axial direction with respect to the position of the fixed pulley half 76, a belt reaction force of the fixed pulley half 76 against the crankshaft 25 exerts less of a detrimental force on the threaded portion (female screw 25g) of the bolt 78 that often leads to thread damage, fastener seizure, etc. Therefore, the bolt can surely be loosened from its threadingly engaged state for maintenance as desired.

Additionally, cooling fins 76a are formed on the back of the fixed pulley half 76 for providing cooling air via an air cleaner 80. The air cleaner 80 is provided in a front portion of the belt cover 68 that covers the V-belt type transmission 70 on the left side of the transmission. The air cleaner 80 is laterally disposed with respect to the cooling fins 76a.

The cooling fins are therefore integral with the crankshaft 25. The outside air, introduced though an outside air introducing path 81 from an outside air opening (not shown) formed in a central upper portion of an outer wall of the belt cover 68 with rotation of the cooling fins 76a, is purified by a cleaner element 80a of the cooling air cleaner 80. The cooling air is fed inside the belt cover 68 to cool the V-belt type transmission, thereby improving the durability of the transmission.

Inside the belt cover 68, the cooling air cleaner 80 removes dust. However, the entry of water and dirt still occurs on a reduced scale.

In this connection, since the fixed pulley half 76 is clamped with the bolt 78 to an end portion of the crankshaft 25, and the bolt 78 is threadingly engaged with the female screw 25g which is formed inside the crankshaft end portion, the threadingly engaged portion of the bolt 78 not exposed to dirt, rust, debris, etc. The threadingly engaged portion of the bolt 79 is positioned inside the crankshaft end portion, so that the entry of dust and water is prevented and the threadingly engaged portion can be protected against rust and corrosion that may lead to seizing of a bolt in a threaded portion in systems of the background art.

Further, since the fixed pulley half 76 is clamped with the bolt 78 to an end portion of the crankshaft 25, the crankshaft 25 does not project outward from the fixed pulley half 76. Accordingly, the crankshaft 25 can be substantially shortened in comparison with clamping with a nut in which case a male screw projects sideways and further outward from the fixed pulley half.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A V-belt transmission comprising:
   a crankshaft having a drive end, wherein the crankshaft includes a plurality of molded crank pins formed integrally with the crankshaft;
   a transmission case, wherein said transmission case is swingably supported around and with respect to the crankshaft;
   a V-belt arranged between a fixed pulley half fixed to an end portion of the crankshaft and an axially movable pulley half supported on the crankshaft in a position laterally opposite to the fixed pulley half; and
   a bolt securing said fixed pulley half to the end portion of the crankshaft, said bolt threadingly engaged with a female screw portion formed within an interior portion of the end portion of the crankshaft, wherein an open edge of the end portion of the crankshaft with the female screw portion formed has a chamfered, tapered edge.

2. The V-belt transmission according to claim 1, further comprising:
   a plurality of cooling fins provided on the fixed pulley half; and
   an outside air inlet port arranged laterally opposite said plurality of cooling fins.

3. The V-belt transmission according to claim 2, wherein the female screw portion is arranged in a position axially inward of the drive end of the crankshaft and the fixed pulley half.

4. The V-belt transmission according to claim 2, further comprising:
   a short sleeve;
   a ramp plate; and
   a long sleeve, wherein the short sleeve abuttingly engages the drive end of the crankshaft and the long sleeve and the short sleeve sandwich the ramp plate therebetween.

5. The V-belt transmission according to claim 1, wherein the female screw portion is arranged in a position axially inward of the drive end of the crankshaft and the fixed pulley half.

6. The V-belt transmission according to claim 1, further comprising a crank weight formed integrally between the crank pins on the crankshaft and without a crankshaft journal.

7. A V-belt transmission comprising:
   a crankshaft having a drive end, wherein the crankshaft includes a plurality of molded crank pins formed integrally with the crankshaft;
   a transmission case, wherein said transmission case is swingably supported around and with respect to the crankshaft;
   a rear wheel drive section;
   a driving pulley operatively connected to said crankshaft and a driven pulley operatively connected to the rear wheel drive section of said transmission;
   a V-belt arranged between said driving pulley and said driven pulley, wherein said driving pulley includes a fixed pulley half fixed to an end portion of the crankshaft and an axially movable pulley half supported on the crankshaft in a position laterally opposite to the fixed pulley half; and
   a bolt securing said fixed pulley half to the end portion of the crankshaft, said bolt threadingly engaged with a bolt hole formed within an interior portion of the end portion of the crankshaft, wherein an open edge of the end portion of the crankshaft has a chamfered, tapered edge.

8. The V-belt transmission according to claim 7, wherein a driving force is transmitted from said driving pulley to said driven pulley.

9. The V-belt transmission according to claim 8, wherein the driving force is transmitted from said driven shaft to an axle via a counter shaft and a plurality of transmission gears.

10. The V-belt transmission according to claim 7, wherein the driven pulley is supported on the driven shaft through a centrifugal clutch.

11. The V-belt transmission according to claim 10, further comprising a transmission chamber formed in a rear portion of the transmission.

12. The V-belt transmission according to claim 7, further comprising:
    a plurality of cooling fins provided on the fixed pulley half; and
    an outside air inlet port arranged laterally opposite said plurality of cooling fins.

13. The V-belt transmission according to claim 7, further comprising:
    a short sleeve;
    a ramp plate; and
    a long sleeve, wherein the short sleeve abuttingly engages the drive end of the crankshaft and the long sleeve and the short sleeve sandwich the ramp plate therebetween.

14. The V-belt transmission according to claim 7, further comprising a crank weight formed integrally between the crank pins on the crankshaft and without a crankshaft journal.

15. A V-belt transmission comprising:
    a crankshaft having a drive end, wherein the crankshaft includes a plurality of molded crank pins formed integrally with the crankshaft;
    a transmission case, wherein said transmission case is swingably supported around and with respect to the crankshaft;
    rear wheel drive section;
    a driving pulley operatively connected to said crankshaft;
    and a driven pulley operatively connected to the rear wheel drive section of said transmission;
    a V-belt arranged between said driving pulley and said driven pulley, wherein said driving pulley includes a fixed pulley half fixed to an end portion of the crankshaft and an axially movable pulley half supported on the crankshaft in a position laterally opposite to the fixed pulley half; and
    a bolt securing said fixed pulley half to the end portion of the crankshaft, said bolt threadingly engaged with a bolt hole formed within an interior portion of the end portion of the crankshaft, wherein the bolt hole is formed in an end face of a left shaft portion of the crankshaft, the bolt hole having
    a depth of about half of a length of the left shaft portion; and a left unthreaded portion, a central female thread portion, and a right unthreaded portion, wherein an open edge of an end portion of the crankshaft with the female thread portion has a chamfered, tapered edge.

16. The V-belt transmission according to claim 15, wherein the central female thread portion is sandwiched between the left unthreaded portion and the right unthreaded portion, and a plurality of male threads from the bolt securingly engage the central female thread portion.

17. The V-belt transmission according to claim 15, further comprising a crank weight formed integrally between the crank pins on the crankshaft and without a crankshaft journal.

* * * * *